United States Patent [19]
Teitelbaum et al.

[11] Patent Number: 5,848,231
[45] Date of Patent: Dec. 8, 1998

[54] SYSTEM CONFIGURATION CONTINGENT UPON SECURE INPUT

[76] Inventors: Neil Teitelbaum, 16 Carlyle Avenue, Ottawa, Ontario, Canada, K1S 4Y3; Gordon Sean Freedman, 41 Elvaston Avenue, Nepean, Ontario, Canada, K2G 3Y1; Stephen J. Borza, 495 Metealfe Street, Ottawa, Ontario, Canada, K1S 3N3; Michael A. Borza, 2036 Woodcrest Road, Ottawa, Ontario, Canada, K1H 6H8

[21] Appl. No.: 772,947

[22] Filed: Dec. 24, 1996

Related U.S. Application Data

[60] Provisional application No. 60/012,318 Feb. 27, 1996 and provisional application No. 60/011,459 Feb. 12, 1996.

[51] Int. Cl.$^6$ .............................. G06F 9/06; G06F 15/15; H04B 1/00
[52] U.S. Cl. ...................... 395/186; 395/187.01; 395/651
[58] Field of Search ............................... 395/186, 187.01, 395/651, 653; 380/23, 25, 4

[56] References Cited

U.S. PATENT DOCUMENTS

| | | | |
|---|---|---|---|
| 4,472,771 | 9/1984 | Bienvenu et al. | 711/151 |
| 5,029,077 | 7/1991 | Fatahalian et al. | 395/653 |
| 5,201,049 | 4/1993 | Shorter | 395/406 |
| 5,229,764 | 7/1993 | Matchett et al. | 340/825.34 |
| 5,257,387 | 10/1993 | Richek et al. | 395/284 |
| 5,497,490 | 3/1996 | Harada et al. | 395/653 |
| 5,713,009 | 1/1998 | Derosa, Jr. et al. | 395/651 |

*Primary Examiner*—Ly Hua
*Attorney, Agent, or Firm*—Neil Teitelbaum & Associates

[57] ABSTRACT

A method of configuring and reconfiguring a computer system based on user authorization is presented wherein at least some users perceive themselves and available system resources as the entirety of the computer system. The resources are configured through use of virtual resources providing predetermined access privileges and configurations for some users. In another aspect, a method is provided of configuring and reconfiguring a computer system based on biometric user input wherein at least some user biometric input is necessary in order to gain authorized access to a system and to configure the system based on the authorized user. The configuration is, preferably, transparent to the user.

38 Claims, 15 Drawing Sheets

Hard Drive Data Structure

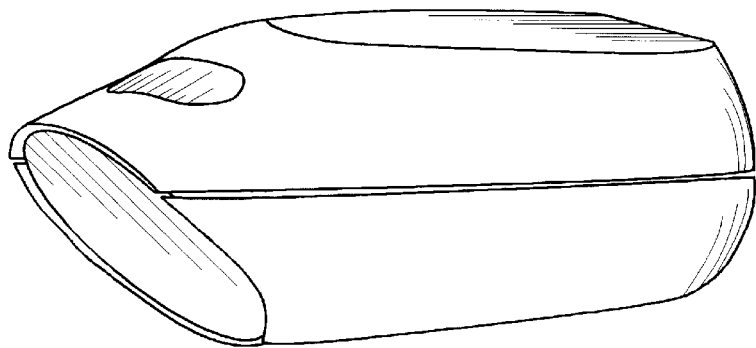
Fig. 13
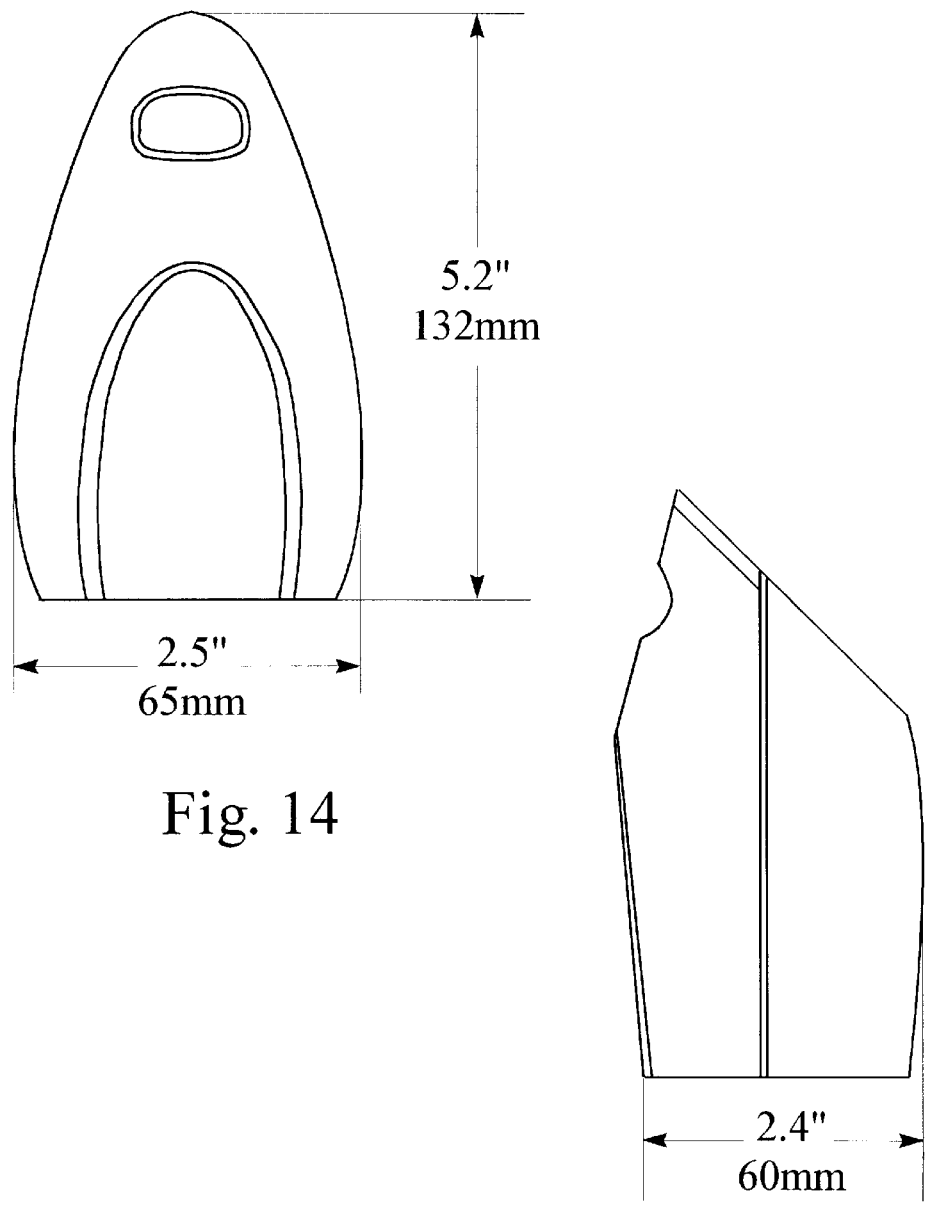
Fig. 14
Fig. 15

5,848,231

SYSTEM CONFIGURATION CONTINGENT UPON SECURE INPUT

This application claims the benefit of U.S. Provisional Application No. 60/012,318, filed on Feb. 27, 1996 and U.S. Provisional Application No. 60/011,459, filed on Feb. 12, 1996.

FIELD OF THE INVENTION

This invention relates generally to computers. More particularly this invention relates to multiple interfaces for multiple users of a same computer.

BACKGROUND OF THE INVENTION

Computer usability is fast becoming an important issue. Further, with the proliferation of computers and computer networks into all aspects of business and daily life— financial, medical, education, government, and communications—the concern over secure file access is growing. One method of providing security from unauthorized access to files is limiting file access as is done on computer networks. A popular operating system for providing file protection is the UNIX operating system.

The UNIX file system provides multi-user access to a central system. Networks of UNIX based computers vary from a single workstation to hundreds and even thousands of workstations. Optionally, a computer simultaneously functions as a central system and as a workstation. A plurality of central systems are connected with many workstations to provide a UNIX network. Alternatively, a single workstation is not connected to any other computers and acts as both workstation and central system.

Each user of a UNIX system must be authorized to use the system. Commonly, such authorization requires a user ID and a password. Alternatively, it is known to use voice prints, fingerprints, other biometric input, magnetic strips or physical keys to access a system. In the most common embodiment, in order to gain access to the central system, users enter a user ID and corresponding password and, upon validation gain access to the file system. A startup script executes which configures the workstation to some limited degree and the user commences use of the workstation. Upon completion of said use, the user logs off.

Under the UNIX operating system, each user is assigned to a group. This provides a number of file access options which are defined in UNIX and outlined below. Privileges are provided to individuals, groups, and everyone and are assigned to any combination of the three. The available privileges are executing, reading and writing. For example, a user sets their files to be read by their group, read and write for themselves, and inaccessible for everyone else. This provides a great deal of control over the environment and file security.

With the advent of telecommuting, companies are looking for ways to lower their overhead. One such method is shared workstations. Further, small home offices often serve a second function as a family computer room. Unfortunately, employees who spend a considerable amount of time at the office store personal information on their computers. Further, those employees customize environments within the computer to meet their specific needs. This has traditionally made workstation sharing inconvenient and undesirable to employees.

Fingerprint imaging devices suitable for obtaining a fingerprint image from a live subject are well known in the literature. Similarly, mouse and other pointing devices are well known, common place computer accessories in desktop computers. An embodiment of this invention relies on a combination of both of these devices in a synergistic manner.

OBJECT OF THE INVENTION

Thus, in an attempt to overcome these and other limitations of known prior art devices, it is an object of this invention to provide a method for system configuration and file system selection upon user verification.

It is a further object of this invention to provide a method for system configuration based upon biometric user input.

SUMMARY OF THE INVENTION

In accordance with the invention there is provided a method of dynamically providing user configuration to a host computer in execution of a current virtual system, comprising a plurality of virtual systems. The method comprises the steps of:

at intervals, determining a user identification;

locating a virtual system in dependence upon the user identification; and when a virtual system associated with the user identification is located, executing the virtual system on the host computer.

In accordance with the invention there is provided a method of dynamically providing user configuration to a host computer in execution of a current virtual system and in communication with a computer network, said network comprising a plurality of virtual systems The method comprises the steps of:

at intervals, determining a user identification;

searching computers in communication with the network for a virtual system associated with the determined user identification; and when a virtual system associated with the user identification is located, executing the virtual system on the host computer.

In accordance with the invention there is provided a method of dynamically providing user configuration to a host computer in execution of an operating system. The method comprises the steps of:

using a biometric input means and at intervals during normal use, determining a user identification;

locating configuration information in dependence upon the user identification; and configuring at least a portion of the host computer in dependence upon the configuration information.

In accordance with the invention there is provided a method of dynamically providing user configuration to a host computer executing an operating system and in communication with a computer network. The method comprises the steps of:

using a biometric input means and at intervals during normal use, determining a user identification;

searching computers in communication with the network for configuration information associated with the determined user identification;

locating configuration information in dependence upon the user identification; and configuring at least a portion of the host computer in dependence upon the configuration information.

It would be advantageous for a single user computer to transparently be configured for multiple users. It would further be advantageous that said multiple users perceive the system as a single user system absent other users.

It would also be advantageous for a computer forming a part of a computer network to be configurable at least in part in response to user biometric input.

BRIEF DESCRIPTION OF THE DRAWINGS

Exemplary embodiments of the invention will now be described in conjunction with the following drawings, in which:

FIG. 13 is a computer rendered drawing of a hand held fingerprint scanner for connection to a personal computer;

FIGS. 14 and 15 are top and side views respectively of the computer rendered drawing shown in FIG. 13;

DETAILED DESCRIPTION OF THE INVENTION

Figure 1:
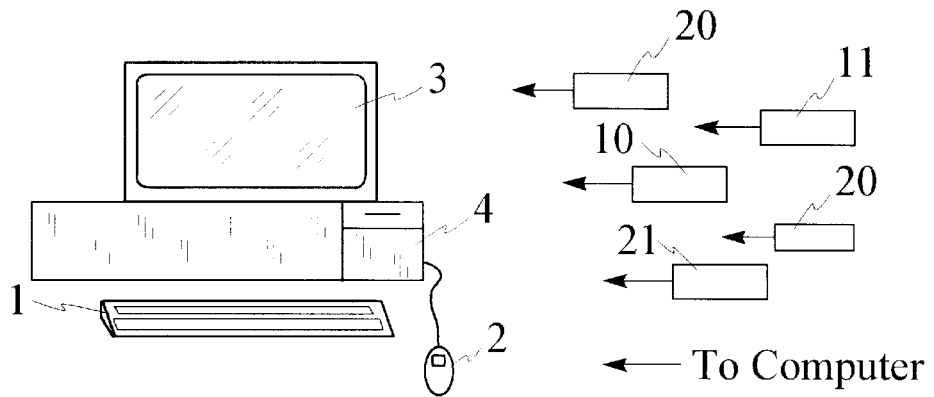
FIG. 1 is a simplified diagram of a computer and associated peripherals.
Figure 2:
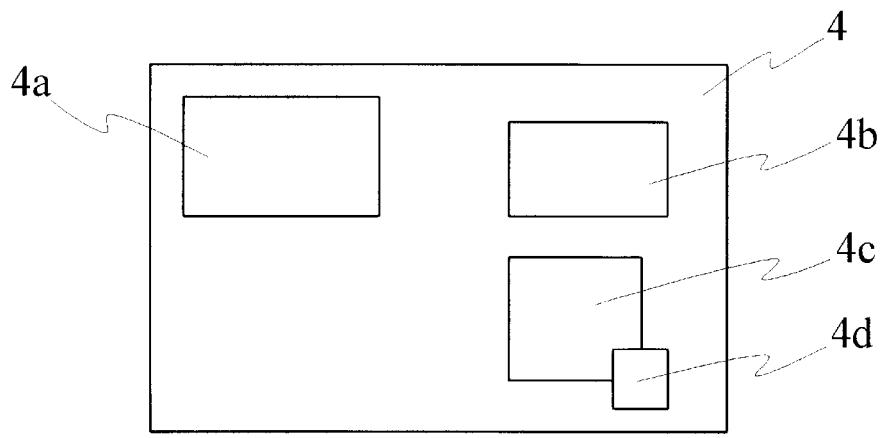
FIG. 2 is a diagram of a non-volatile storage means segmented into logical non-volatile storage means.

Referring to FIG. 1, a computer system is provided with a keyboard 1, a mouse 2, a display means 3, a non volatile memory means 4 in the form of a hard drive, and a user authorization means. Such features are all known in the art and commonly form part of computer systems. Alternatively, less common devices for performing the same functions are employed; a joystick or a track pad is used instead of a mouse 2 and so forth. The user authorization means is an integral part of the operating system software and is not shown.

According to the present invention when an authorized user is detected, the system configures itself to provide a customized interface to the user, based on system configuration comprising, for example, file management configuration. System configuration includes screen resolution, available peripherals, keyboard layout, mouse speed, sound settings, and user information. Alternatively, system configuration includes a different combination settings. File management configuration includes file permissions, files available to the user, file locations and when used with a GUI icon locations and styles. Alternatively, file management configuration includes different file settings.

At start up as well as after any lengthy pause in computer use, user authorization is again required. Such pauses are currently used as indications for screen savers and are generally known in the art. Alternatively, a separate pause detection algorithm is introduced for the purposes of the present invention.

According to an embodiment of the present invention, a computer system is provided with multiple logical configurations. Each configuration corresponds to a logical storage device 4a, 4b, 4c, and 4d; user preferences; and logical peripherals. Each configuration further corresponds to physical implementations of the logical devices. The present invention provides a method of selecting a logical configuration upon user authorization. Optionally, the logical configurations are varied and are stored for later use as expected for logical configurations behaving in a similar fashion to system settings and logical systems behaving in a similar fashion to physical systems.

According to the present invention, a physical computer having a hard drive and a variety of peripherals comprises a plurality of logical systems. Each logical system is provided with a logical hard drive. When using compression technology, total space allocated to all the logical hard drives is larger than the physical hard drive present in the system. Alternatively, this is not so. Typically the logical hard drives will be allocated a total amount of storage space which is less than that available to the physical hard drive. The logical hard drives are each provided with software, data files, system information, and configuration information.

A first authorized user accessing a logical hard drive is informed of the logical drive information as if it were a physical device. For example, using Microsoft® Windows® the logical drive appears as drive C:. Other portions of the physical hard drive not used for the logical hard drive are inaccessible to the first authorized user and appear not to exist at all.

A similar situation exists for a desktop interface when a graphical user interface is present. A first authorized user who moves a file to a new locations, finds the file in the new location upon returning to the computer. The intermediate use of the system by a further authorized user, in no way affects the first authorized user's changes or files. In fact, the further authorized user has no access to the first authorized user's files or configuration and may be unaware that same exists.

A similar situation exists for peripheral devices. A first authorized user may prefer a laser printer 10 while a further authorized user prefers a dot matrix printer 11. Each user sets the default printer for their logical system. The system through alternate use by the users, switches between default printers based on the logical system in use; however, to the users, the system appears as it was left.

Further, the method of the present invention provides security to users. The first authorized user not only has no access to files but also has no knowledge of the files of the further authorized user. A patent application title may be confidential until such has issued and yet, the title is a good file name during drafting of an application.

For example, given a home office wherein a husband and wife work and their children play and do homework, a system is given a default configuration for young children and unauthorized users. The default configuration provides no access. Alternatively for a toddler, the default configuration provides access to a number of software packages; disk peripherals in the form of internal disk drives are configured to only allow read and seek operations; resolution of a display is reduced to compensate for a toddler's difficulty in accurate placement of a pointing means; the mouse 2 is slowed down; the keyboard 1 is disabled as is a power switch; and some peripherals are disabled such as a modem, a laser printer, and a scanner. In a system comprising a GUI, the available files are displayed and unavailable files are not; the unauthorized user being limited to those available choices. Through this configuration, the unauthorized user is provided an interface as if the rest of the files available were simply not there.

Alternatively, the toddler is permitted to save files within a default user area. The default area appears as the hard drive to the toddler and, as previously noted, appears as drive C: on Microsoft® Windows® based systems. Optionally, the hard drive is a segment of a computer's hard drive. Alternatively, the hard drive is protected through software. Software applications requiring more resources than those allocated to the user do not execute. From the user's view of the system, it only contains available resources.

In this fashion, access is provided to the computer without a need for parents to lock all important files or store them other than on the local hard drive. Further, a child is permitted to create a configuration that is desirable, with the exception of physically moving computer parts and peripherals, without effecting the parents' use of the system or their work.

When the wife accesses the computer as an authorized user, the system appears differently. Different peripherals are enabled; The keyboard 1 is an example of a peripheral that is enabled for the wife. The screen resolution matches the wife's preferences as do other aspects of the system. The wife has access to her files and the system appears absent the toddler's software. The wife works within her resources and saves files to her non-volatile storage means 4b. Optionally, a physical non-volatile storage means 4 is separate from those of other users. Alternatively, the non-volatile storage means is incorporated into the same physical or logical device 4. To the wife, the logical non-volatile storage means 4b appears as a complete and self contained physical device to which she has access. The system appears as her computer and, likely, appears completely unchanged from the last time she made use of the computer. In actual fact, the logical non-volatile storage means 4b which the wife is accessing may form a small fraction of a physical device or may encompass parts of several physical devices. This invention is concerned with the appearance and configuration of the computer system to each authorized user.

Regardless of the toddler's activities, the system of the wife is unchanged. Alternatively, the system of the wife includes the default "unauthorized" access space thereby including any newly created or updated files created during an unauthorized user's session.

Preferably, a designated user is given the ability to setup and remove users. Optionally, such a user is provided with access to all user configurations, but this need not be the case. For example, in a work environment where users store personal information on their local hard drive, such information is rendered inaccessible to anyone but an authorized user.

In essence all configuration items in the form of volume, screen intensity, disk cache, available files, open windows, allowable programs, resolution, speed, etc. are automatically controlled in a fashion that is completely transparent to the users of the system and renders all users of the system transparent to each other.

The method of system configuration is applicable in telecommuting or workstation sharing. When three (3) individuals share a desk, it is highly advantageous that each has their own computer and yet a company need only buy one system according to the present invention. Each employee finds the system as it was left, with an exception for power on/off where the power supply is not software controlled or where a power disruption has occurred, and any personal information contained thereon is protected. Only a user with authorization is permitted access to an employee's local files and configuration. Using this method, a physical workstation is be shared by several individuals transparently.

Figure 3:
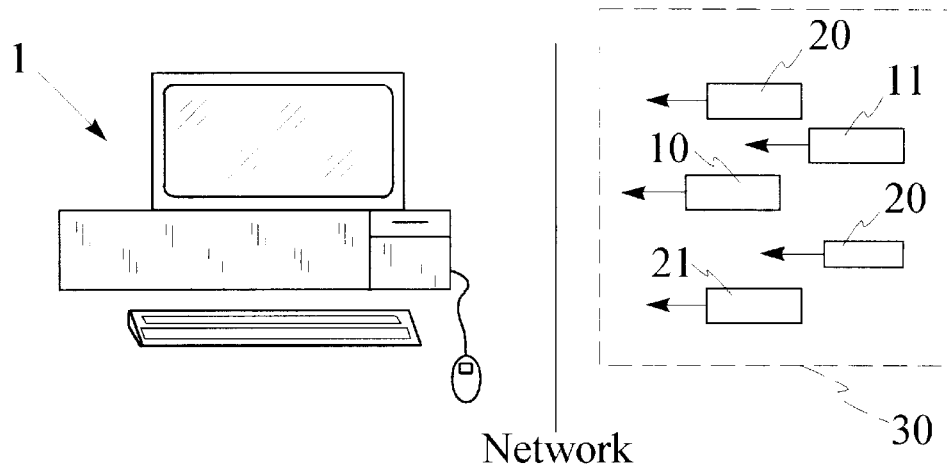
FIG. 3 is a simplified diagram of a computer in communication with a server via a network.
Figure 4:
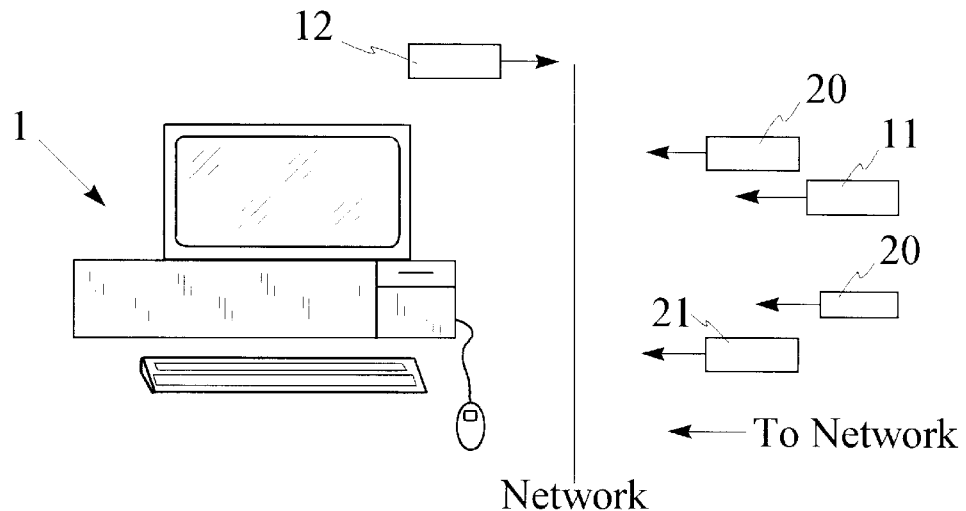
FIG. 4 is a simplified diagram of a computer in communication with a plurality of computers via a network.

Referring to FIGS. 3 and 4 two network configurations of computer systems employing a method according to the present invention are shown. In FIG. 3, a client server network is shown wherein all logical systems are stored on the server 30. Upon user identification, a client computer 1 queries the server 30 for a logical system or configuration for the identified user. When present, the logical system or configuration is returned to the client computer 1 for execution thereon. In FIG. 3, a plurality of logical systems 10, 11, 20, and 21 are shown stored on the server 30. In FIG. 4, a peer to peer network is shown wherein all logical systems are stored on computers in communication with the network. Upon user identification, a computer 1 queries all computers on the network for a logical system or configuration for the identified user. When present, the logical system or configuration is returned to the requesting computer 1 for execution thereon. In FIG. 4, a plurality of logical systems 10, 11, 20, and 21 are shown stored somewhere on the network. A variety of methods of improving performance of a peer to peer network using queries of the type described above are known, and, optionally, when compatible, are used with the present invention. Alternatively, a hybrid of peer to peer networking and client server networking is employed.

Figure 5A:
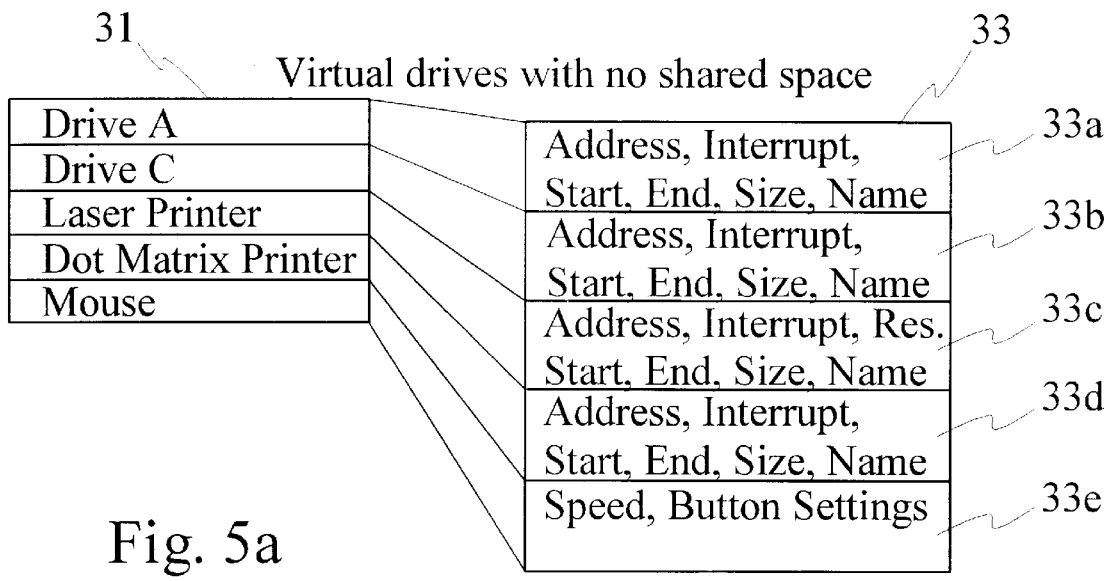
FIGS. 5a, 5b, and 5c are simplified diagrams of device allocation methods for use with the present invention.

Referring to FIG. 5a, a memory diagram of a virtual device table is shown. The table 31 is provided with entries for each virtual device accessible by the system. These devices include, hard drives, removable media drives, floppy drives, CD ROM drives, modems, network adapters, keyboards, mice, track balls, track pads, printers, etc. Alternatively, the devices include a different set of devices. Each entry in the table is associated with a further entry elsewhere in the form of a device record. The device record 33 contains information on device hardware, device configuration and on device accessibility. A printer device record 33c contains an interrupt for the printer, a resolution, a printer name, a printer address, and other printer related information. A hard drive device record 33*b* contains information on address, size, bad sectors, name, interrupt, speed, and other drive parameters. A mouse device record 33*e* contains address, speed, button configuration, driver location, and other mouse parameters. A floppy drive device record 33*a* and a dot matrix device record 33*d* are also shown.

In order to change device availability for a system, the virtual device list is changed and a user accessing the hard drive, for example, accesses a device record for the drive showing a different physical device, or blocking out different sectors as bad sectors or unavailable sectors.

Figure 5B:
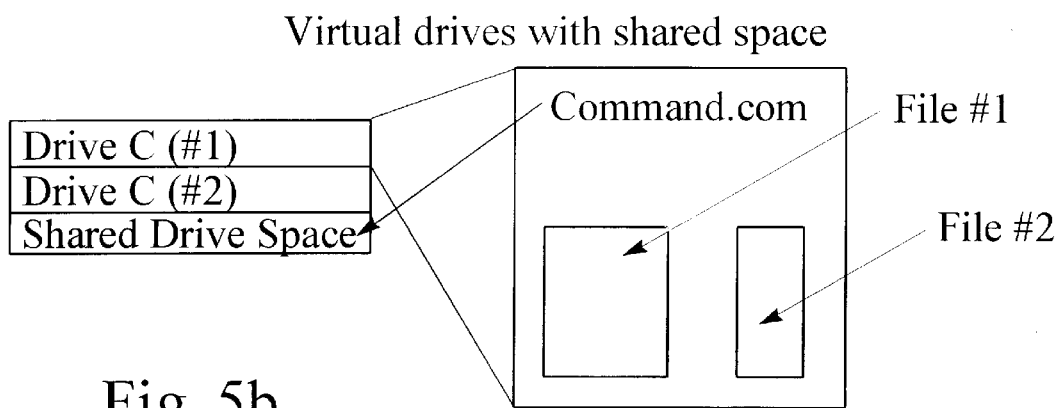

Referring to FIG. 5*b*, a memory diagram for a single physical hard drive having two virtual drives thereon and a shared storage area is shown. Drive C (#1) is provided with a plurality of electronic files stored thereon. Also stored on Drive C (#1) are pointers to files stored within the shared storage area and shown as command.com. This format for virtual devices reduces data duplication in some instances and also reduces software licensing requirements.

Figure 5C:
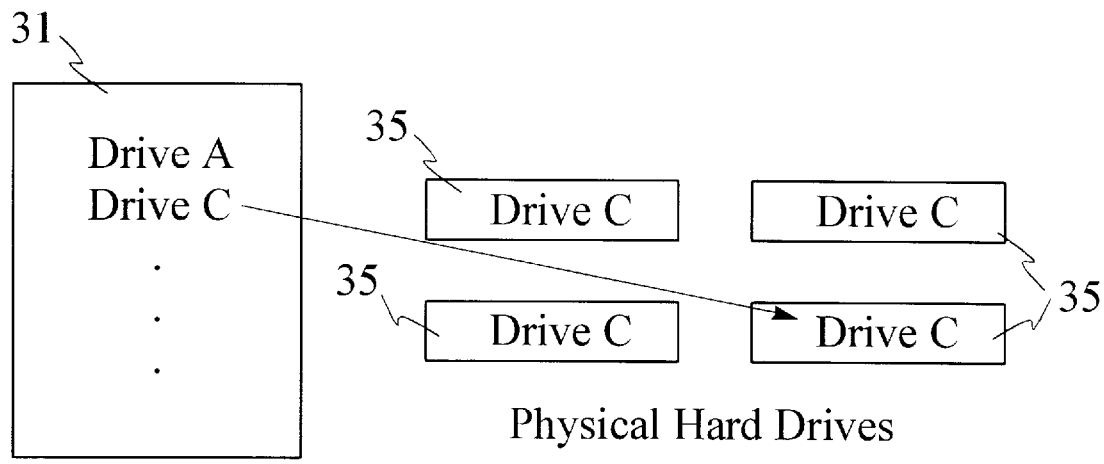

Referring to FIG. 5*c*, a virtual device table 31 is shown wherein each virtual device refers to an autonomous hardware device. Using such a device table requires a separate hard drive 35 for each user of a system; however, floppy drives and printers are shared. A virtual device table as shown in FIG. 5*c* is of particular use where user mobility is essential and, therefore, a storage device may be installed on another computer system at a future time. When this is the case, the use of a segmented or partitioned drive results in extra work to move a user to another physical system.

Preferably at least some software resources are shared across logical systems such as system executable files and executable application programs.

A computer mouse having incorporated fingerprint imaging circuitry is described in detail below with reference to FIGS. 12 through 17. Using such a device, connected to a personal computer provides a system in accordance with the teachings of this invention that allows one's personal configuration and file management to be automatically configured on the basis of a user's fingertip being on the mouse.

It is an aspect of the present invention that physical resources such as a microprocessor are shared among authorized users using the system at different times. The method according to this invention eliminates duplicate physical computers while maintaining the unique look and feel of an individual's personal computer and personal configuration. Thus, users of the method according to this invention may share a computer but not share, alter or view any data belonging to other users.

Figure 6B:
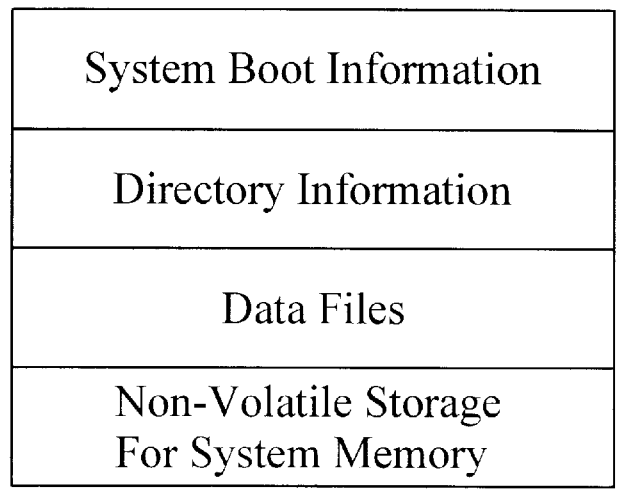
FIG. 6b is a memory diagram of a non-volatile storage device.
Figure 6:
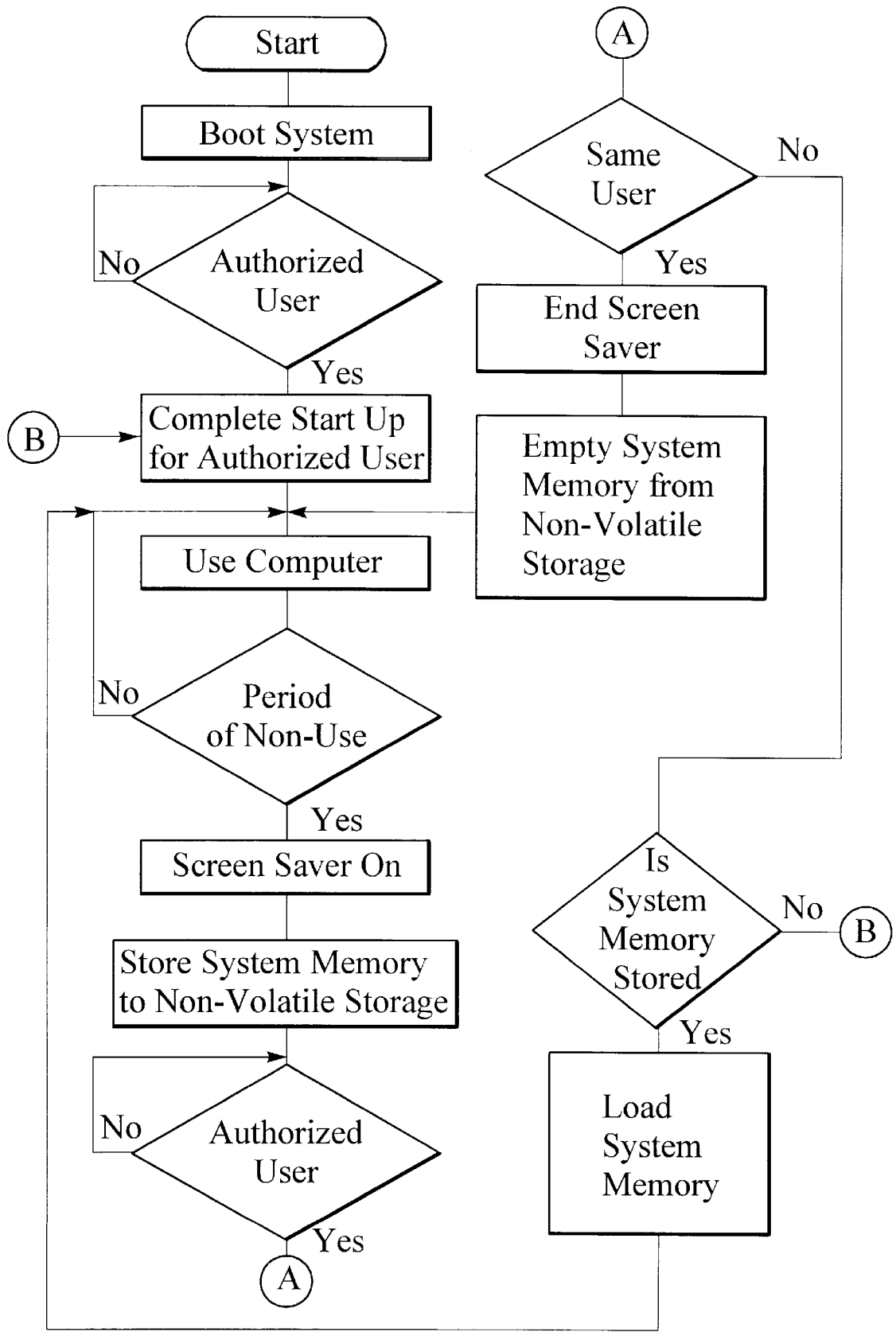
FIG. 6 is a flow diagram of a method of providing unique user configuration in dependence upon user authorization.

In FIG. 6 is shown a flow diagram of a method of providing multiple user configurations on a single computer system in a dynamic fashion. The system begins a boot process. This allows the system to verify memory and physical devices. A limited system software is loaded and executes on the computer system. The boot process then halts awaiting authorization of a user. The authorization may comprise a password and user ID, biometric information in the form of a fingerprint, or a magnetic card. Preferably the authorization is in the form of biometric information and is entered through normal use of the computer.

When user authorization has occurred, the system completes the boot process for the authorized user. A virtual device table as shown in FIG. 5*a* is constructed to establish available devices and to disable access to other devices. Alternatively, another device access method is used to enable and disable access to physical devices. The virtual device table, as shown in FIG. 5*a*, contains entries for each available virtual device. A virtual floppy drive A is mapped to a physical device—in this case, to a physical floppy drive A. A virtual hard disk is mapped to a partition on a physical hard disk, thereby alleviating a need for a separate physical hard disk for each authorized user. The device record for each device provides access parameters for the device. For example, a modem device record allows long distance calls from a virtual modem or, alternatively, disallows same. A hard drive device record enables read access only from the virtual hard drive. Alternatively, read-write access is enabled.

The computer 1 is used in its configuration by the authorized user. When the computer remains unused for a period of time, a screen saver is initiated. Screen savers are well known in the art of computer systems. The screen saver locks the system until user authorization is again established. Once the screen saver has commenced, the state of the system and the virtual devices is saved into a non-volatile storage device. Preferably, the non-volatile storage device is protected from user access. Further preferably, the non-volatile storage device stores encrypted information. In an embodiment, the encryption method for data stored in the non-volatile storage device is in dependence upon an aspect of user authorization.

Upon user authorization, the system verifies that the newly authorized user is the same as the authorized user. When this is the case, the screen saver is disabled and the non-volatile storage associated with the authorized user is cleared. Normal use of the computer system resumes. When the newly authorized user is not the authorized user, non-volatile memory associated with the newly authorized user is checked. When it is empty, a boot process is executed and use of the computer for the newly authorized user is initiated. Alternatively, when the associated non-volatile storage is not empty, the system is reset to a state similar to that when the newly authorized user last used the system and the newly authorized user then has use of the system.

Resetting the system to a previous state requires loading of memory with previous memory contents and reinitializing and manipulating some peripheral devices. For example, a modem requires a reset code and a code indicative of a default mode of operation and a video card requires a reset code and a code indicative of colour depth and resolution.

Potential uses for the method of this invention such as improving computer use during shift work, home office use, etc. are set out above.

Referring to FIG. 6*b*, a non-volatile storage device memory map is shown wherein non-volatile storage for system memory is provided outside of allocated space on the storage medium for data and system information. The space required for the non-volatile storage is dependent on an estimated number of potential concurrent system users. Alternatively, the space allocated is allocated dynamically to ensure sufficient resources. Alternatively, separate non-volatile storage means are used for storing system memory.

Figure 7:
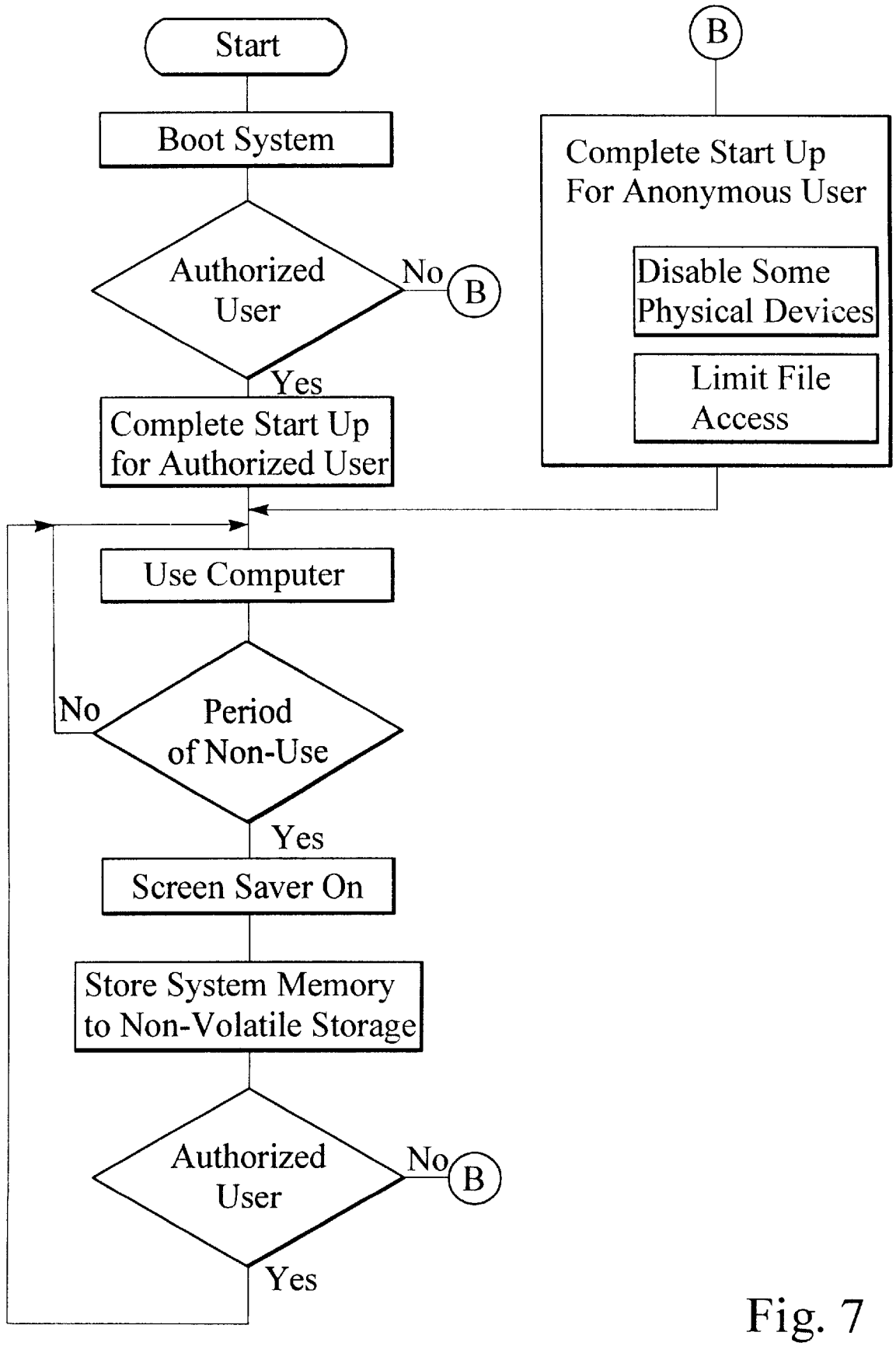
FIG. 7 is a flow diagram of a method of providing one configuration for all authorized users and a second other configuration for other users.

Referring to FIG. 7, a further method according to the invention is shown. According to the method shown, a system has two configurations. In a first configuration, authorized users use the system. In a second configuration, other users use the system. A method such as this is useful for administrated systems with general access. Administrators are authorized users and others or non-authorized users. Access to the system is limited for non-authorized users thereby providing security against certain predetermined operations.

According to this method, after a period of non use, a system displays a screen saver or other system lock. User authorization must be initiated in order to access the system. When successful, a first configuration is loaded (or maintained when it was already loaded) and system use is permitted. When authorization fails, a second configuration is loaded (or maintained when it was already loaded) and system use is permitted. In either configuration, a period of non-use is followed by a user authorization process.

Left handed people often find it difficult to use a computer system with a right handed mouse. The buttons are configured reverse from a comfortable configuration. Often, to alleviate this difficulty, left handed people configure their own mouse to a left handed or custom configuration. Further, some people like screen resolutions that produce very small text while others prefer larger text.

Figure 8:
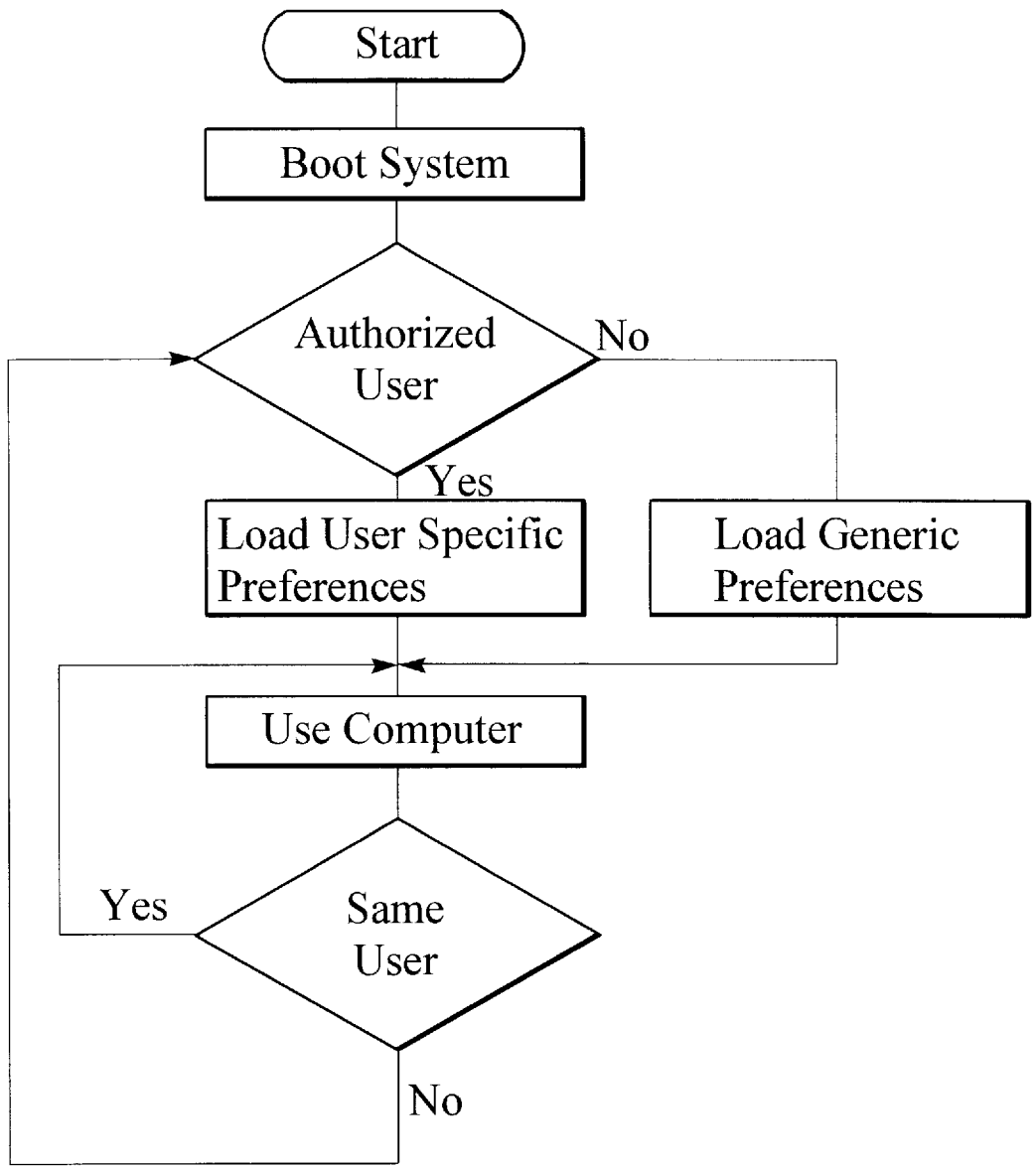
FIG. 8 is a flow diagram of a method of providing predetermined user preferences to different users of a same computer system.

Referring to FIG. 8, a method of providing user specific preferences on existing computer systems is shown. According to the method, a user is identified and predetermined preferences are loaded for that user. One method of identifying the user is through use of biometric information in the form of a fingerprint. With a biometric mouse, a user constantly enters their biometric information. A processor within a computer system or network processes the biometric information provided at intervals or in response to predetermined events and the user is identified. When a change of user is indicated through a change in biometric information, the new user is identified and when available, their preferences are loaded into the system. Any preference changes made by the user are stored associated with their identification for later retrieval.

According to the method of FIG. 8, a left handed user holds a right handed biometric mouse. Their biometric information is identified and unknown. They are presented with generic preferences. When they enter their own preference for a left handed mouse, this is saved associated with their identification. In future when they provide their biometric information to the system, the mouse attached to the system they are using is automatically reconfigured to be left handed. Alternatively, when the left handed user holds a right handed biometric mouse. Their biometric information is identified and they are known. The mouse is then reconfigured to act as a left handed mouse until another user provides new biometric information to the system.

Figure 9:
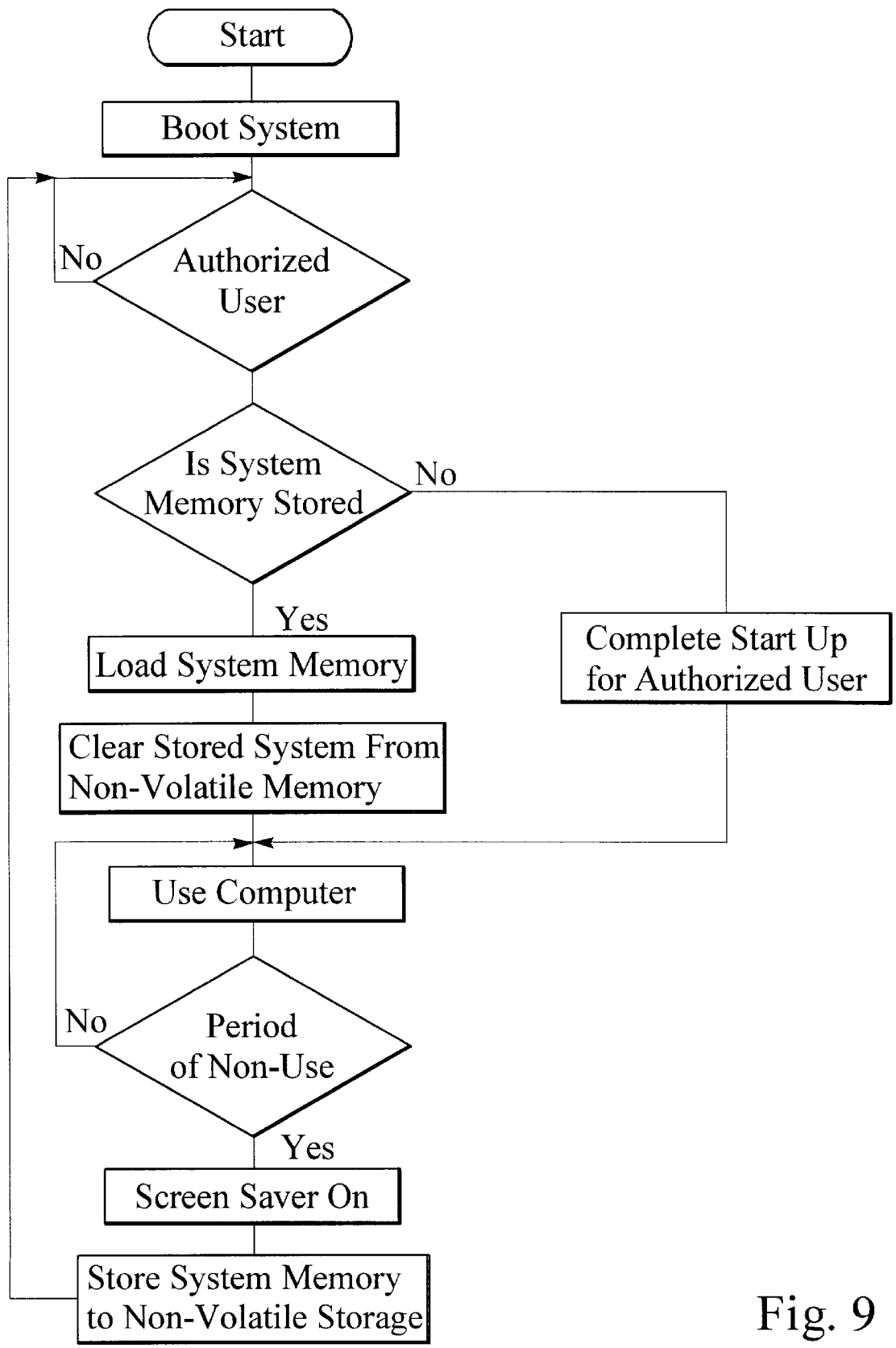
FIG. 9 is a flow diagram of a further method of providing unique user configuration in dependence upon user authorization.

Referring to FIG. 9, a further method according to the invention is shown wherein once a user is authorized, the computer system checks non-volatile storage for system memory stored and associated with the authorized user. This verification occurs on system start up as well as upon resumption of computer use by an authorized user. Using such a method, power outages and system shut downs do not affect users of a system with the exception of the authorized user engaged in using the system when the power outage or system shutdown occurred. A system "crash" occurring during normal use of a system does not affect other users. This improves robustness and allows for many different applications of systems according to the present invention.

In a network environment, a user often desires that a logical system or portions thereof be available anywhere on the network. In an embodiment, the present invention provides in a network comprising a plurality of workstations 1 each provided with a biometric input means, in the form of a fingerprint scanner, a means for configuring computers upon input of biometric information from a user.

In use, a user places a finger tip on the biometric input means at any workstation 1 from which biometric data relating to a finger print is verified against predefined biometric data. When the biometric data is verified as being that of an authorized user, the user is authorized. Preferably, the authorization of users including the verification of biometric data is performed on a predefined workstation, central server, or group thereof. Once authorized a logical system belonging to the user or a portion of the logical system is sent via the network to the workstation 1 and provided to the user during use of the workstation. Preferably, this feature is capable of being overridden for collaborative work and mentoring.

An example, of an implementation of the invention for a user desiring colour settings at any workstation 1 in communication with a network is described. During a meeting in a conference room containing a workstation 1 further comprising a fingerprint scanner, a fingertip of a user is provided to the scanner. The workstation 1 is then provided with the colour settings for that user.

Preferably, the biometric input means is contained within a pointing means in the form of mouse or a joystick. Alternatively, the biometric input means is contained within a keyboard. Such embodiments have the benefit of authorizing all users of the network on an ongoing basis. With the exception of when the method disclosed herein is overridden, users have a default configuration unless they are authorized users. Further alternatively, a separate biometric input means is used.

Alternatively, a user desires their entire logical system to be available anywhere on the network. Such is the case for demonstrations where a software application has been fully tested and functioning on a particular logical system. Currently, a prudent user transports the workstation 1 to the conference room prior to the demonstration. Using the method of this invention and upon providing biometric input to the biometric input means, the logical system is updated to match that of the user. Physical devices will be consistent with the user's physical devices and will appear as the identical logical devices to which the user has access at their workstation. It will be apparent to those of skill in the art that physical devices such as scanners or modems not present on a second other computer or workstation will not function as when present.

The method herein described may be used from remote locations through a modem and modem communications. Preferably, bi-directional communications and peer to peer networking capabilities are provided allowing mapping of any physical device to a logical system which in turn may execute on any workstation 1. Preferably, system wide configuration items are applied as well as physical configuration items. Some examples of system wide configurations are local physical keyboard configuration in the form of number of keys and keyboard drivers display hardware driver configuration and mouse hardware driver configuration, as well as corporate security measures and policy implementations.

Figure 10:
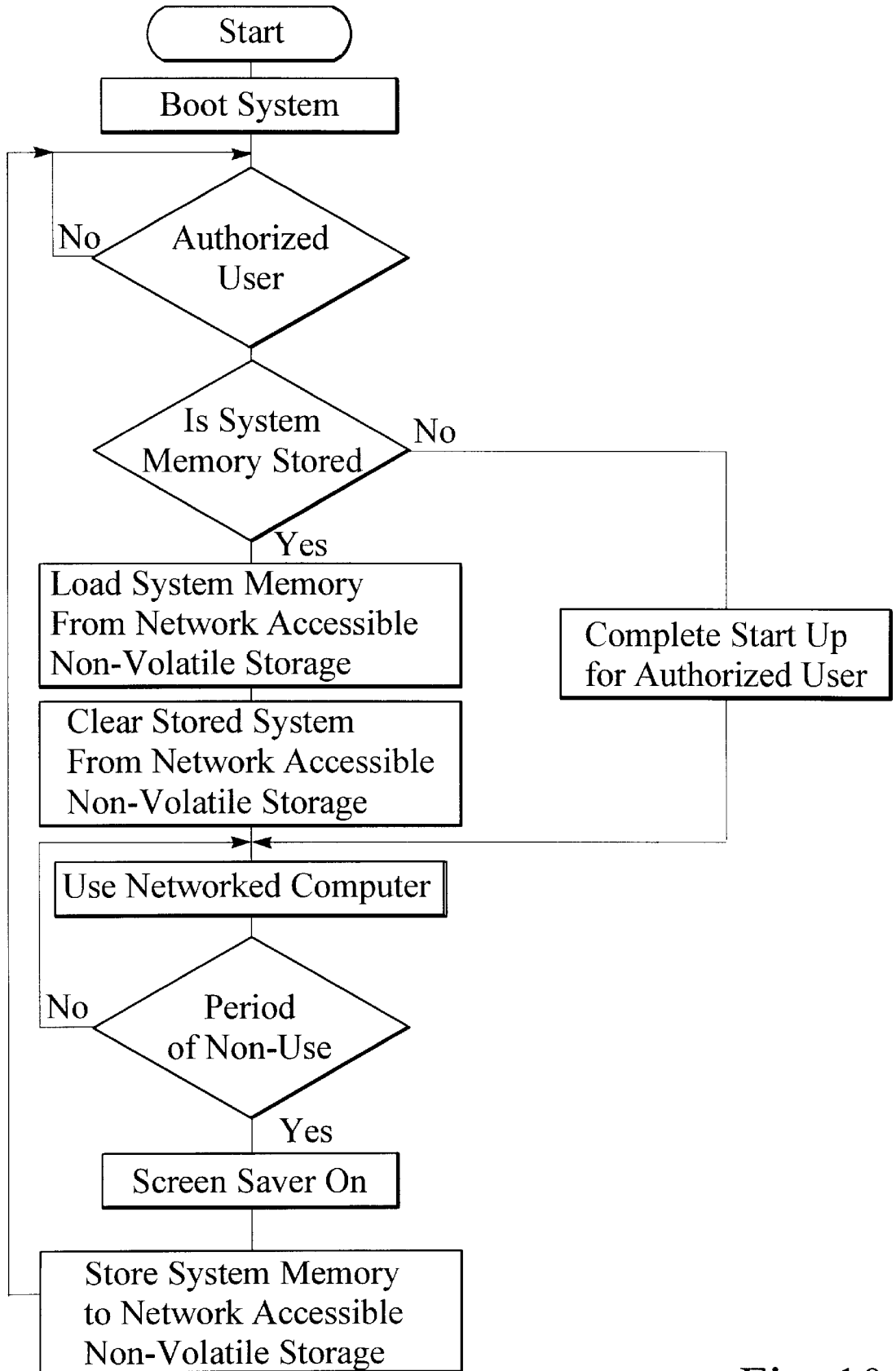
FIG. 10 is a flow diagram of a method of providing unique user configuration for a user of a network in dependence upon user authorization and further for providing a method of transporting a user environment from a computer system connected to a network to a second computer system connected to the network.

Referring to FIG. 10, an application of a method according to the present invention to network computing is shown. A workstation 1 connected to a network begins a boot process. The boot process is interrupted and the system prompts for user authorization. When user authorization is successful, the computer system searches the network for stored system memory associated with the authorized user. The system memory is stored in a central location. Alternatively, the system memory associated with a user is stored on a workstation 1 and peer to peer networking is employed to locate the system memory.

When system memory associated with the user is located, it is retrieved and the computer system currently accessed by the user is configured in dependence upon the retrieved system memory. The located stored system memory is then cleared. Workstation use is permitted to the authorized user. When a pause in system use occurs or when a user indicates a desire to relocate, the system is frozen by a screen saver or other system freezing method and the system memory is stored either locally or to a central location and associated with the authorized user.

When system memory associated with the user is not located, the system is initialized in a normal start up state for the user and the user is provided with system access. Such is the case when the authorized user has crashed their system, restarted their system, or shut down their system voluntarily.

Alternatively, before searching the network for stored system memory, the system verifies that the authorized user is different from the last authorized user to access the system. When the authorized user is different, a method as described above is employed; however, when the authorized user is the same authorized user, an added step of comparing the located stored system memory with the system memory of the workstation occurs. One method of facilitating such a comparison is by storing a serial number with each saved system memory and associating the same serial number with the system memory in volatile memory on the computer system. When the serial numbers match, no system memory is loaded as the system memory is current. Alternatively, when the serial numbers are different, the located stored system memory is retrieved in accordance with the method above. This added step reduces network traffic associated with stationary users but also allows users to work on a plurality of workstations concurrently, each workstation 1 provided with an up to date image of the system configuration and memory while in use.

Figure 11:
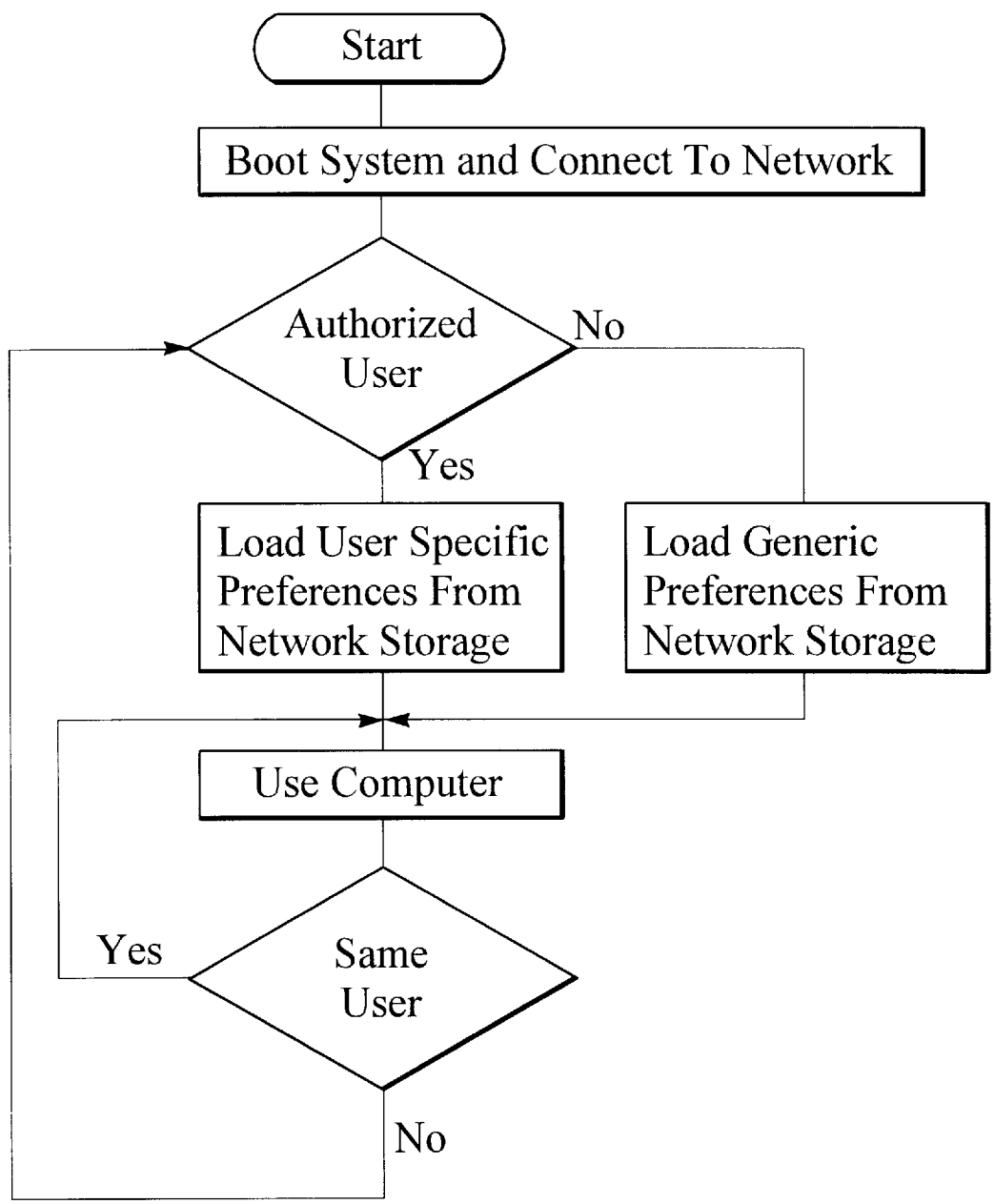
FIG. 11 is a flow diagram of a method of providing predetermined user preferences to different users of computer systems connected to a network and further for providing a method of transporting user preferences to a computer system connected to the network and being accessed by a user.

Referring to FIG. 11, an application of a further method according to the present invention to network computing is shown. A workstation in communication with a network is provided with a user authorization means. A user is prompted for authorization and when the user is an authorized user, the system requests preferences associated with the authorized user from the network. The preferences, when found, are loaded onto the workstation where the authorized user is working. When the user is not an authorized user, a generic set of preferences either for the computer network or for the workstation is loaded. When a user authorization system in the form of a user identification system capable of continuously or at intervals monitoring the user of a system such as a biometric mouse and appropriate processing circuitry is used, the preferences may be modified and are automatically saved for future use by the user. Alternatively, only authorized users are capable of modifying and saving system preferences.

In an alternative embodiment, failure to identify a user results in the user being locked out. Locking out is well known in the art and is accomplished through screen savers and other means. The use of locking out functionality in place of a default configuration or a default virtual system is optional. Further optionally, some identified users are locked out. This allows security against repeat abuse of a system by a same person or by a same access code. The decision of whether to allow unidentified individuals access to the system is determined in dependence upon system application.

Figure 12:
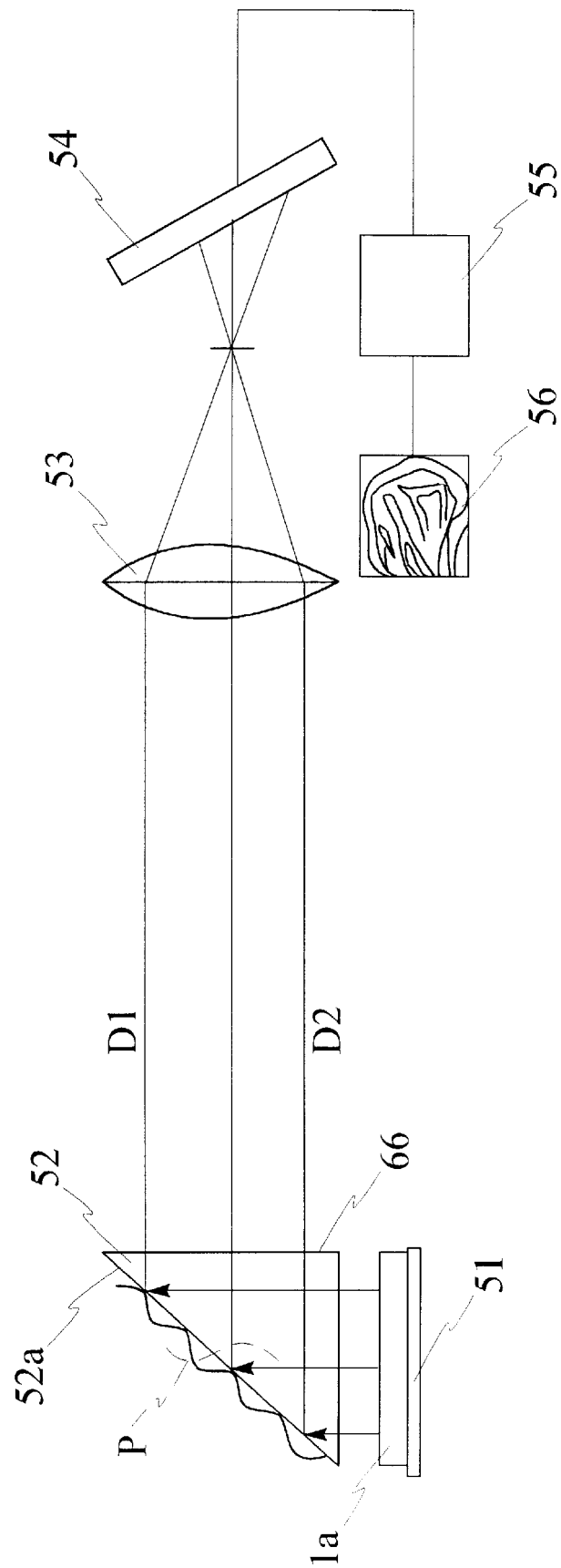
FIG. 12 is a prior art side elevation of an embodiment of an apparatus for identifying fingerprints.

Referring now to FIG. 12, a schematic view shows the construction of a representative embodiment of a known type of optical apparatus for imaging a fingertip. This apparatus comprises a light source 51 and a diffuser 1a for emitting a light beam to the subject fingerprint "P". A triangular prism 52 includes a slant surface 52a of about 45 degrees inclination angle on which the fingerprint "P" is laid. An image producing lens system 53 is provided for receiving the reflected light beam from the valleys of the subject fingerprint laid on the prism 52 and then producing an image of the subject fingerprint "P" at an area charge coupled device 54 (hereinafter, referred to simply as "the area CCD") for converting the produced fingerprint image into an electric signal; the apparatus further includes an amplifying/analyzing circuit 55 (signal processing circuit) for amplifying then analyzing the electric signal for the subject fingerprint provided by the area CCD 54, and a monitor 56 for displaying the fingerprint image shown. The transparent triangular prism 52 can be made of glass or another suitable material. Other prism shapes such as polygonal e.g. tetragonal may also be employed. The index of refraction of the prism material is preferably in the range of about 1–2.

The prism 52 has a fingerprint receiving face 52a, upon which a finger is placed (indicated by fingerprint P). A fingerprint viewing face 66 is disposed at an acute angle, typically of about 45°–50°, to the fingerprint receiving face 52a. This permits a larger viewing surface and a sharper viewed image than prior art devices. Two opposed parallel faces are perpendicular to the fingerprint receiving face 52a.

In the embodiment of FIG. 12, the light source 51 is in the form of a multi-light emitting diode(LED) array, although other conventional light sources could be used. A suitable LED array is one of the type described in U.S. Pat. No. 5,210,588 as comprising a number of high intensity ultra-luminescence chips, which provides a light intensity of about three times that of common LEDs. The disclosure of this Patent is incorporated herein by reference.

A very short and compact device is packaged into a computer mouse, for attachment to a personal computer, and available for use with the present invention is discussed below with reference to FIG. 12. A piano-convex lens 53 is used having a focal length of approximately 6 mm. The CCD array 54 has a pixel element size of approximately 10×10 $\mu$m. Optionally, an iris having a diameter of the 1 mm is disposed between the prism and the lens. The iris reduces blur on the CCD array 54 and is required when lens and prim optics are not sufficient to sufficiently focus an image upon the CCD array 54. The distance from the lens face to the prism back face is approximately 5 cm. The distance from the lens to the CCD face is approximately 1 cm. Preferably, the CCD is tilted as shown at an angle of 5° with respect to the lens back face.

FIGS. 13, 14, and 15 show the ergonomically designed hand held device that contains the circuitry shown in FIG. 12. By reducing the length of the optical path in the manner shown, this small hand held device is realizable and may be manufactured at a relatively low cost, using an inexpensive lens.

Although white light may be used, it is preferable to employ a monochromatic light source. Red light of a wavelength in the range of 700–800 nm is most preferred, since this wavelength range is at the highest response region of the conventional electronic imaging devices used. Illumination in the range of 0.5 to 2.5 lux has been found to be effective.

Figure 16:
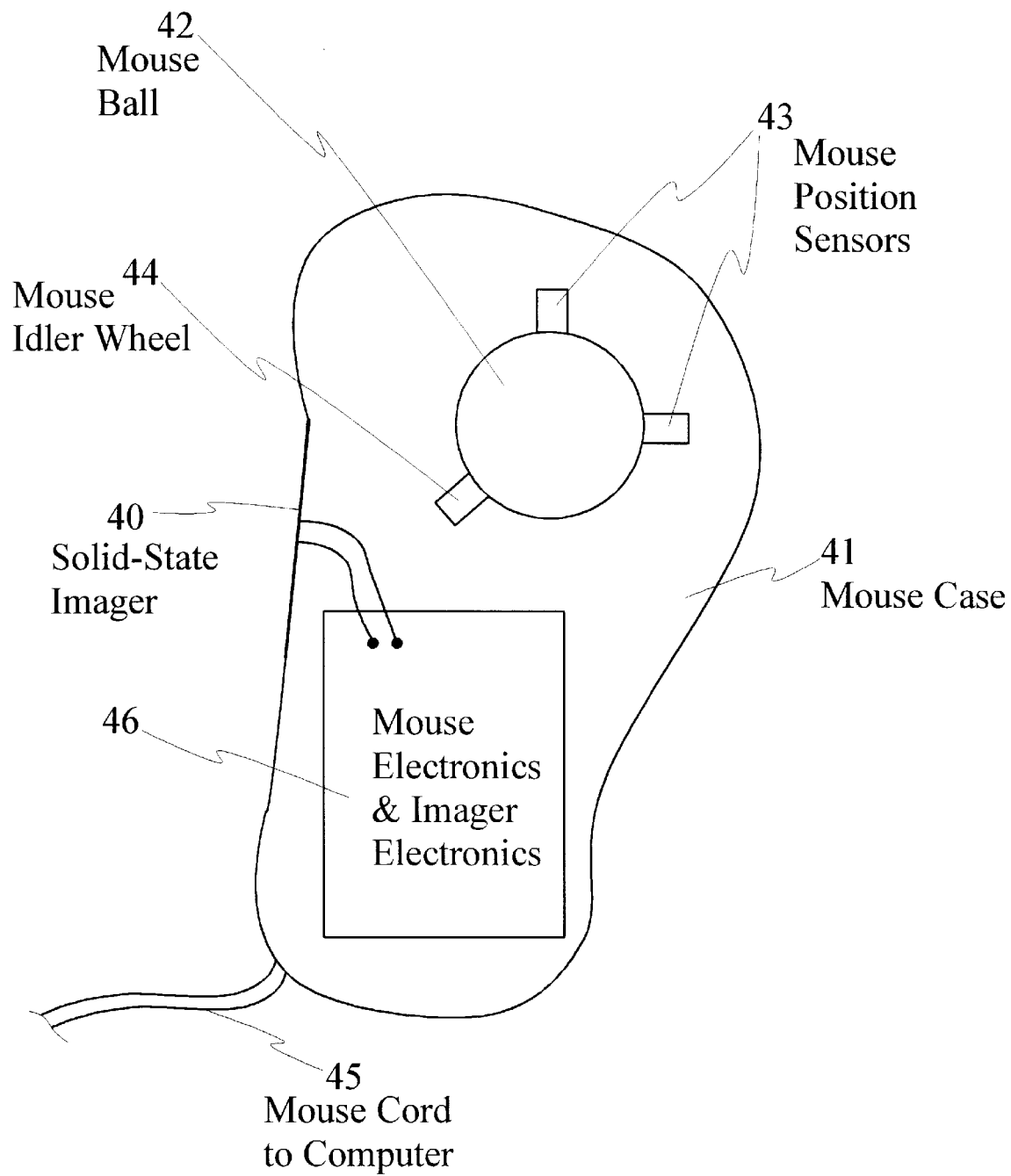
FIGS. 16 and 17 are schematic diagrams of a mouse having fingerprint scanning means incorporated therein.

Referring to FIGS. 16, a mouse comprising a biometric imager is shown. The biometric imager is a capacitive biometric sensor 40 and is disposed on an outside of the mouse 41. The mouse comprises a case. Inside the case, a track ball 42 with appropriate sensors 43 for sensing ball movement are disposed. Also, an idler wheel 44 is in contact with the ball to retain the ball in place. Alternatively, the mouse movement is sensed through other motion sensing means. The imaging sensor 40 is disposed on a side of the mouse where a thumb normally rests. Alternatively, the sensor is disposed on a mouse button where another finger tip rests during computer use. The mouse is shown with a cable 45 for connection to a computer. Alternatively, a wireless mouse is used. Circuitry 46 within the mouse transforms position and biometric input information into suitable data for provision to a host computer.

Figure 17:
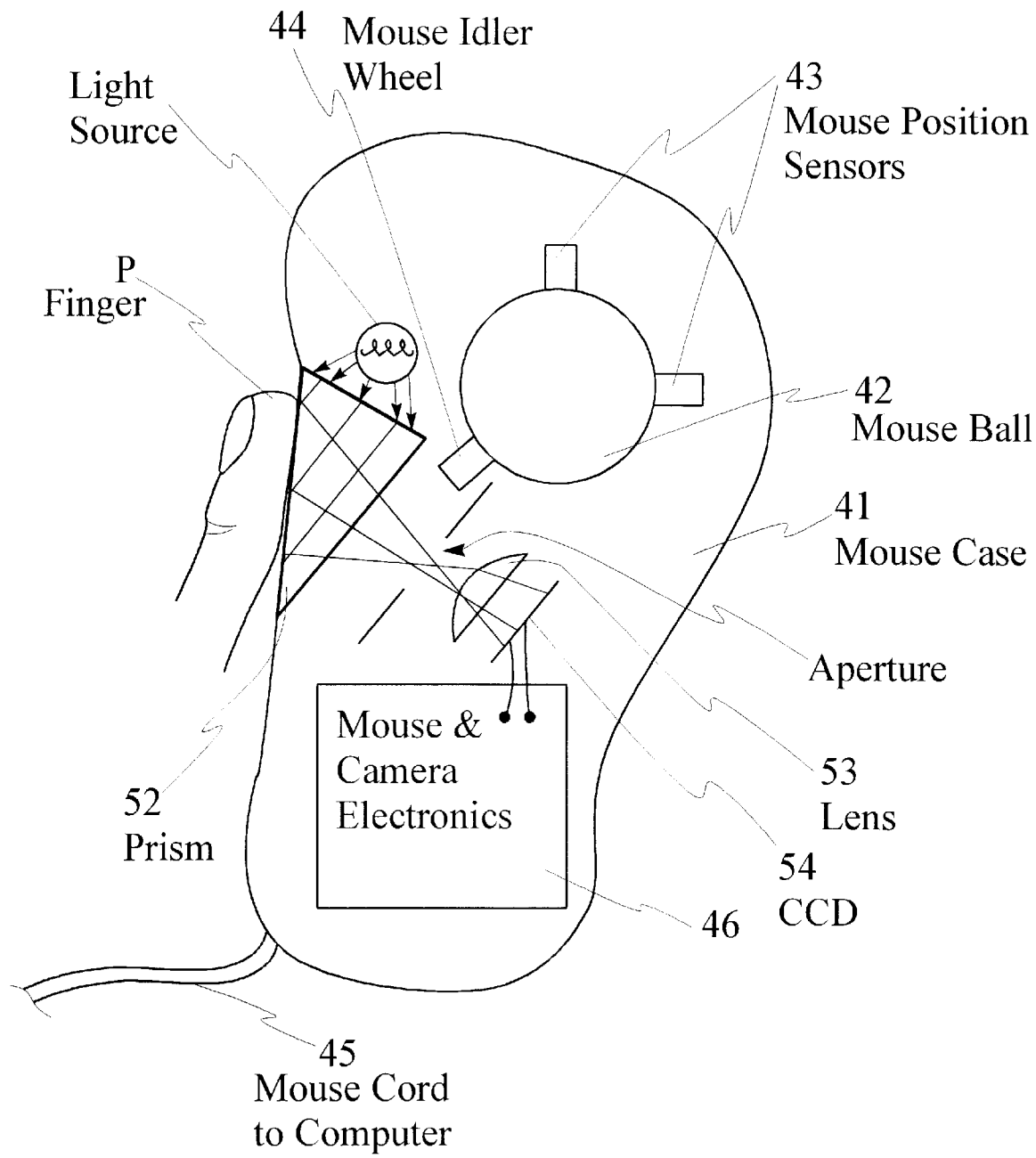

Referring to FIGS. 17, a mouse 41 comprising a biometric imager is shown. The biometric imager is an optical biometric imager comprising optics similar to those shown in FIG. 12 and disposed within the mouse. The conventional mouse 41 comprises a case. Inside the case, a track ball 42 with appropriate sensors 43 for sensing ball movement are disposed. Alternatively, the mouse movement is sensed through other motion sensing means. The prism 52 is disposed on a side of the mouse where a thumb normally rests. Alternatively, the prism 52 is disposed on a mouse button where another finger tip rests during computer use. The mouse is shown with a cable 45 for connection to a computer. Alternatively, a wireless mouse is used.

Figure 18:
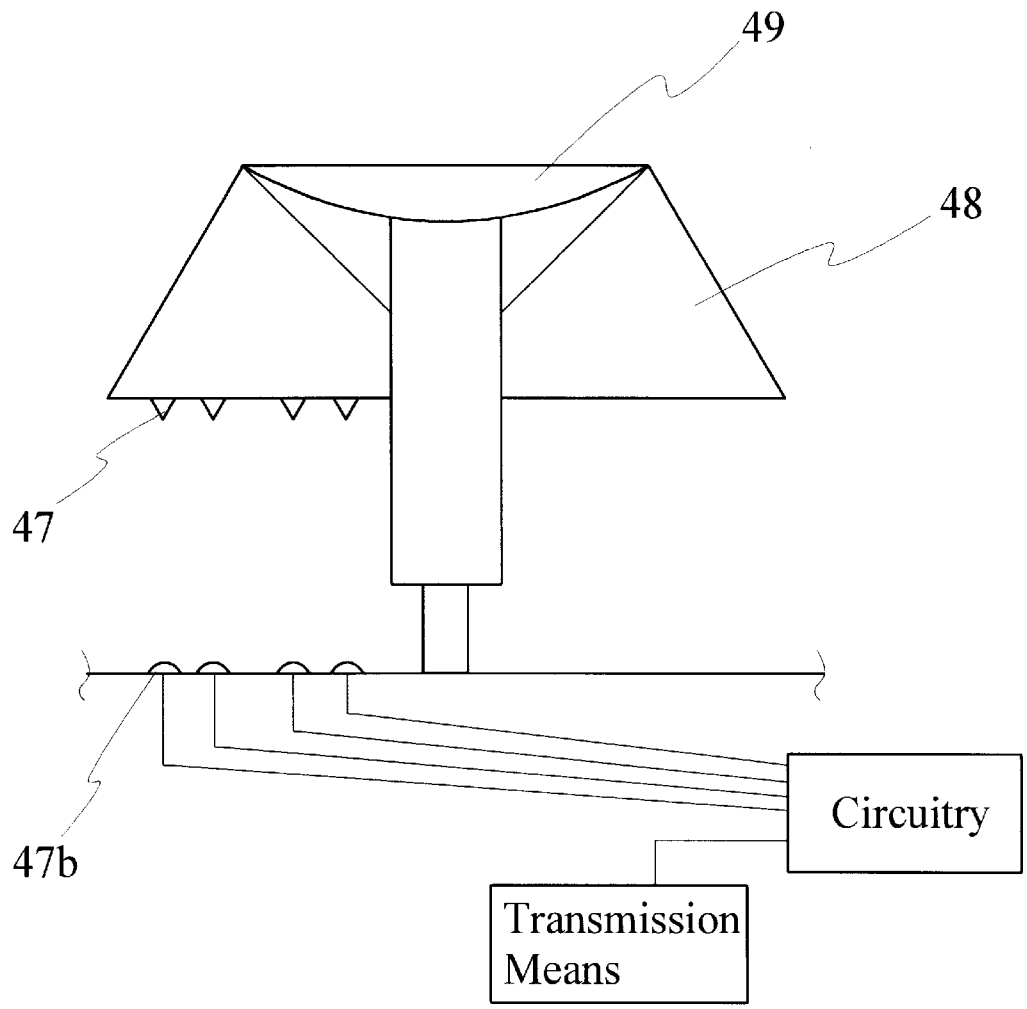
FIG. 18 is a schematic diagram of a key incorporating a capacitive fingerprint sensor.

Referring to FIG. 18, a fingerprint imaging device housed within a key 48 disposed on a keyboard or as a mouse button is shown. The fingerprint imaging device is a capacitive fingerprint sensor 49 etched onto a glass cover of the key. Upon depressing the key by the user, a fingerprint image is sensed by the sensor 49 and provided to the keyboard or mouse via coupling means 47. The coupling means 47 are disposed on a lower edge of the key for mating with electrical contacts 47b on a keyboard or mouse base. Alternatively, the coupling means are spring connections to wires etched into a post on which the key or button is supported.

U.S. Pat. No. 4,353,056 in the name of Tsikos issued Oct. 5, 1982, discloses a fingerprint sensor that uses a capacitive sensing approach. Those parts of the disclosure of this patent not included in this specification are incorporated herein by reference. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

A further contact imaging device is described in U.S. Pat. No. 5,325,442 in the name of Knapp, issued Jun. 28, 1994. Those parts of the disclosure of this patent not included in this specification are incorporated herein by reference. Knapp describes making a capacitance measuring imaging device in the form of a single large active matrix array involving deposition and definition by photolithographic processes of a number of layers on a single large insulating substrate. Electrodes and sets of address conductors formed of metal and field effect transistors are formed as amorphous silicon or polycrystalline silicon thin film transistors (TFTs) using an appropriate substrate of, for example, glass or quartz.

The coupling means is connected to circuitry within the keyboard. The circuitry is for processing the information and identifying a user of a keyboard. Alternatively, the circuitry is for processing the information prior to transmitting same to a host computer. Further alternatively, the circuitry is for transmitting the information to a host computer.

Figure 19A:
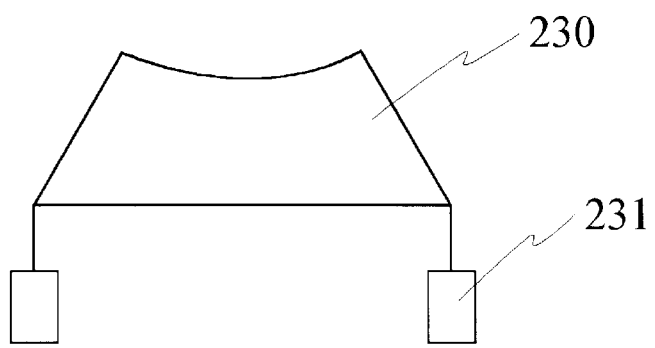
FIGS. 19a, 19b, and 19c are simplified diagrams of a keyboard incorporating an optical fingerprint scanning means in a key therein; and, FIG. 20 is a simplified diagram of an optical fingerprint scanner capable of imaging fingertips disposed on each of a plurality of adjacent keys.
Figure 19B:
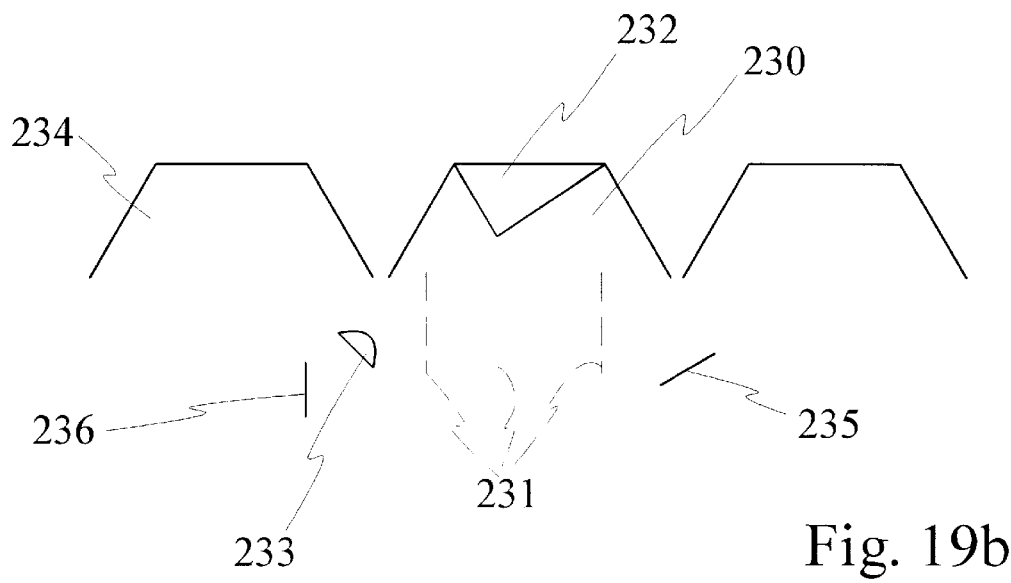
Figure 19C:
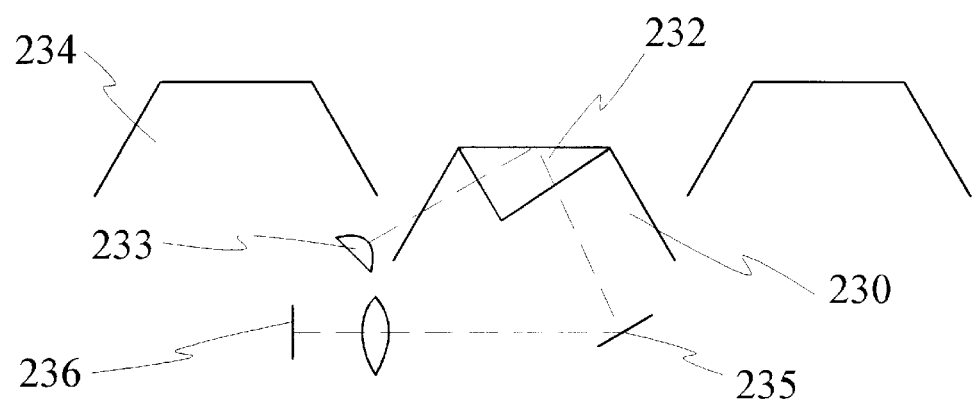

Referring to FIGS. 19a, 19b and 19c, a fingerprint imaging device housed within a keyboard is shown. The device is an optical fingerprint imaging device. A key 230 on a keyboard is provided with a mechanism 231 that does not obstruct an optical path for the imaging device. In FIG. 19a the mechanism 231 is shown as a two part mechanism supporting opposite sides of a key and forming an open path therebetween. Referring to FIG. 19b, a prism 232 is disposed within the key 230. The prism 232 and the key 230 are free to move along an axis supported by the mechanism 231, and shown in dashed lines. The fingerprint imaging device captures an image when the key 230 is in a predetermined position. In the diagram of FIG. 19c, the position for image capture is while the key 230 is pressed down. A light 233 located below an adjacent key 234, illuminates the prism 232 when the key 230 is depressed and reflected light off a fingertip depressing the key 230 is reflected off a mirror 235 through a lens 235a and onto a CCD 236. Optionally, the optics includes further lenses and/or mirrors (not shown). The CCD 236 provides an electronic representation of the image to circuitry within the keyboard for processing and for transmission to a host computer.

Figure 20:
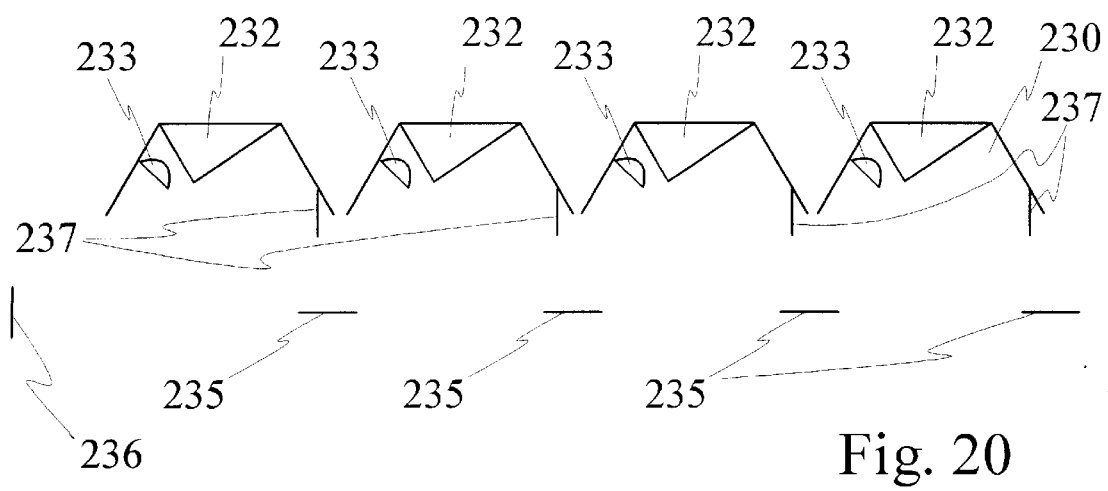

Referring to FIG. 20, a fingerprint imaging device housed within a keyboard is shown. The imaging device operates similarly to that shown in FIGS. 19a, 19b and 19c but allows imaging of fingertips contacting each of a plurality of keys. A key 230 is shown comprising a prism 232 and a light source 233. Alternatively, a single light source mounted below the key is used. An actuating arm 237 is disposed on the key extending from a lower edge thereof. When the key 230 is pressed, the actuating arm 237 contacts a mirror base 235 and causes a mirror disposed on the base to tilt. The tilted mirror reflects light received from the prism toward a CCD 236. Each mirror is adjusted to direct light toward the CCD 236 when tilted. In this way, each key 230 acts as an input source for a fingerprint imaging device, and only a single CCD 236 is required.

Touch typing is a common way to enter information through a keyboard. Two different systems of touch typing are in common use today—QWERTY and Dvorak. QWERTY, so named for the letters in the top row left hand, is a more popular keyboard format, while Dvorak, so named after its inventor, is considered superior. A touch typist need not look at a keyboard or at a monitor during typing. A Dvorak typist using a QWERTY keyboard without noticing, types gibberish until the problem is discovered.

Using the keyboard described above and shown in FIGS. 19a, 19b, 19c, and 20, keyboard layout is an available configuration setting. A user, indicates in their preferences whether or not keyboard layout should follow them to other workstations. When the user selects the follow option, and a user of a keyboard is identified as the user and an appropriate keyboard layout is assigned in dependence upon their preferences. Thus, touch typists using a computer in communication with a network and supporting the method according to this invention, are free to use any computer keyboard as if the keyboard were a keyboard supporting their preferred keyboard layout.

Further, when a mouse and a keyboard each comprises biometric input sensors, user configuration of the mouse and of the keyboard are associated with the users thereof and not with a single user. Alternatively, only a single user configuration is active at a given time.

A further application of the herein described invention is for timed system backups. A user sets a preferred interval for system backup. During the interval and in the background, the system caches and stores system memory and status information. Alternatively, the system is saved in one pass during or at an end of each interval. When the computer freezes or crashes, the user restarts the computer, provides biometric information or another form of identification, is identified, and the most recently stored system backup is loaded as the current operating system. The time, when unchanged, indicates the amount of work lost. Alternatively, the time in the saved system is displayed and the system clock is updated. Further alternatively, the system time is not stored with the saved system information. When using a network, a file server is often provided with power protection means and uninterrupted power supplies. Uninterrupted power supplies provide battery power during power failures. Saving system data to a file server, allows for minimal data loss in the event that failure of a workstation occurs.

Once a method of storing virtual systems in accordance with the invention is implemented, these same systems are stored at intervals or by a background task in order to implement this further aspect of the invention.

Numerous other embodiments may be envisaged without departing from the spirit and scope of the invention.

What is claimed is:

1. A method of dynamically providing user configuration to a host computer in execution of a current virtual system, the host computer comprising a plurality of virtual systems, the method comprising the steps of:

at intervals, determining a user identification of a user of the host system;

locating a virtual system in dependence upon the user identification; and when a virtual system associated with the user identification is located, executing the virtual system of the host computer.

2. The method of dynamically providing user configuration to a host computer comprising a plurality of virtual systems as defined in claim 1 further comprising the steps of:

storing a current virtual system loaded in memory of the host computer to a non-volatile storage means; and loading the located virtual system in dependence upon the user identification.

3. The method of dynamically providing user configuration to a host computer comprising a plurality of virtual systems as defined in claim 1 further comprising the steps of:

determining if the user identification is a same user identification or a different user identification as that associated with a current virtual system;

when a different user identification is determined, storing a current virtual system in execution on the host computer to a non-volatile storage means and loading the different virtual system in dependence upon the user identification; and when a same user identification is determined, continuing execution of the current virtual system.

4. The method of dynamically providing user configuration to a host computer as defined in claim 1 further comprising the step of:

when a virtual system associated with the user identification is not located, executing a virtual system on the host computer in dependence upon a default configuration.

5. The method of dynamically providing user configuration to a host computer in execution of a current virtual system, comprising a plurality of virtual systems, as defined in claim 1 wherein the user identification is determined in dependence upon biometric information.

6. The method of dynamically providing user configuration to a host computer as defined in claim 5 wherein the biometric information is provided to biometric input means incorporated into a pointing device.

7. The method of dynamically providing user configuration to a host computer as defined in claim 5 wherein the biometric information is provided to biometric input means incorporated into a keyboard.

8. A method of dynamically providing user configuration to a host computer as defined in claim 7 wherein the biometric information is provided by imaging fingertips resting on keys and/or fingertips depressing keys.

9. A method of dynamically providing user configuration to a host computer in execution of a current virtual system and in communication with a computer network, said network comprising a plurality of virtual systems, the method comprising the steps of:

at intervals, determining a user identification;

searching computers in communication with the network for a virtual system associated with the determined user identification; and when a virtual system associated with the user identification is located, executing the virtual system on the host computer.

10. The method of dynamically providing user configuration to a host computer as defined in claim 9 further comprising the steps of:

storing a current virtual system loaded in memory of the host computer on a computer in communication with the network; and loading the virtual system.

11. The method of dynamically providing user configuration to a host computer as defined in claim 9 further comprising the steps of:

determining if the user identification is a same user identification or a different user identification as that associated with a current virtual system;

when a different user identification is determined, storing a current virtual system in execution on the host computer on a computer in communication with the network and loading the different virtual system in dependence upon the user identification; and when a same user identification is determined, continuing execution of the current virtual system.

12. The method of dynamically providing user configuration to a host computer as defined in claim 9 further comprising the steps of:

determining if the user identification is a same user identification or a different user identification as that associated with a current virtual system;

when a different user identification is determined, storing a current virtual system in execution on the host computer on a computer in communication with the network and loading the different virtual system in dependence upon the user identification;

when a same user identification is determined, determining if the current virtual system is a most recent virtual system associated with the user identification;

when a most recent system is not determined, loading the more recent virtual system in dependence upon the user identification; and, when a most recent system is determined, continuing execution of the current virtual system.

13. The method of dynamically providing user configuration to a host computer as defined in claim 9 further comprising the step of:

when a virtual system associated with the user identification is not located, executing a virtual system on the host computer in dependence upon a default configuration.

14. The method of dynamically providing user configuration to a host computer in execution of a current virtual system and in communication with a computer network, said network comprising a plurality of virtual systems, as defined in claim 9 wherein the user identification is determined in dependence upon biometric information.

15. The method of dynamically providing user configuration to a host computer in execution of a current virtual system and in communication with a computer network, said network comprising a plurality of virtual systems, as defined in claim 14 wherein the biometric information is provided to biometric input means incorporated into a pointing device.

16. The method of dynamically providing user configuration to a host computer in execution of a current virtual system and in communication with a computer network, said network comprising a plurality of virtual systems, as defined in claim 14 wherein the biometric information is provided to biometric input means incorporated into a keyboard.

17. The method of dynamically providing user configuration to a host computer in execution of a current virtual system and in communication with a computer network, said network comprising a plurality of virtual systems, as defined in claim 16 wherein the biometric information is provided by imaging fingertips resting on keys and/or fingertips depressing keys.

18. A method of dynamically providing user configuration to a host computer in execution of an operating system, the method comprising the steps of:

using a biometric input means and at intervals during normal use, determining a user identification;

locating configuration information in dependence upon the user identification; and configuring at least a portion of the host computer in dependence upon the configuration information.

19. The method of dynamically providing user configuration to a host computer as defined in claim 18 further comprising the steps of:

storing current configuration information from the host computer in non-volatile storage means; and loading the located configuration information.

20. The method of dynamically providing user configuration to a host computer as defined in claim 18 further comprising the steps of:

determining if the user identification is a same user identification or a different user identification as that associated with a current configuration information;

when a different user identification is determined, storing a current configuration information from the host computer in non-volatile storage means and loading the different configuration information in dependence upon the user identification.

21. The method of dynamically providing user configuration to a host computer as defined in claim 18 further comprising the step of:

when configuration information associated with the user identification is not located, loading default configuration information on the host computer.

22. The method of dynamically providing user configuration to a host computer as defined in claim 18 further comprising the step of:

when configuration information associated with the user identification is not located, pausing execution of the current operating system.

23. The method of dynamically providing user configuration to a host computer as defined in claim 18 wherein the biometric input means is incorporated into a pointing device.

24. The method of dynamically providing user configuration to a host computer as defined in claim 23 wherein the biometric input means is a fingerprint imaging device disposed for provision of a finger tip during normal use of the pointing device.

25. The method of dynamically providing user configuration to a host computer as defined in claim 18 wherein the biometric input means is incorporated into a keyboard.

26. The method of dynamically providing user configuration to a host computer as defined in claim 25 wherein the biometric input means is a fingerprint imager for imaging fingertips resting on keys and/or fingertips depressing said keys.

27. A method of dynamically providing user configuration to a host computer executing an operating system and in communication with a computer network comprising the steps of:

using a biometric input means and at intervals during normal use, determining a user identification;

searching computers in communication with the network for configuration information associated with the determined user identification;

locating configuration information in dependence upon the user identification; and configuring at least a portion of the host computer in dependence upon the configuration information.

28. The method of dynamically providing user configuration to a host computer in communication with a computer network as defined in claim 27 further comprising the steps of:

storing current configuration information from the host computer on a computer in communication with the network; and loading the located configuration information.

29. The method of dynamically providing user configuration to a host computer in communication with a computer network as defined in claim 27 further comprising the steps of:

determining if the user identification is a different user identification from that associated with a current virtual system; and when a different user identification is determined, storing current configuration information from the host computer on a computer in communication with the network and loading the different configuration information in dependence upon the user identification.

30. The method of dynamically providing user configuration to a host computer in communication with a computer network as defined in claim 27 further comprising the step of:

when configuration information associated with the user identification is not located, loading a default configuration information on the host computer.

31. The method of dynamically providing user configuration to a host computer in communication with a computer network as defined in claim 27 further comprising the step of:

when configuration information associated with the user identification is not located, pausing execution of the operating system.

32. The method of dynamically providing user configuration to a host computer in communication with a computer network as defined in claim 27 wherein the biometric input means is incorporated into a pointing device.

33. The method of dynamically user configuration to a host computer in communication with a computer network as defined in claim 32 wherein the biometric input means is a fingerprint imaging device disposed for provision of a finger tip during normal use of the pointing device.

34. The method of dynamically providing user configuration to a host computer in communication with a computer network as defined in claim 32 wherein the configuration information relates to the pointing device.

35. The method of dynamically providing user configuration to a host computer in communication with a computer network as defined in claim 27 wherein the biometric input means is incorporated into a keyboard.

36. The method of dynamically providing user configuration to a host computer as defined in claim 35 wherein the biometric input means is a fingerprint imager for imaging fingertips resting on keys and/or fingertips depressing said keys.

37. The method of dynamically providing user configuration to a host computer as defined in claim 35 wherein the configuration information relates to the keyboard.

38. The method of dynamically providing user configuration to a host computeer in communication with a computer network as defined in claim 29 further comprising the steps of:

when the user identification is a same user identification as that associated with a current virtual system, determining if the configuration information on the host computer is most recent configuration information associated with the user identification; and, when the user configuration is not a most recent stored configuration information, loading the most recent stored configuration information in dependence upon the user identification.

* * * * *

UNITED STATES PATENT AND TRADEMARK OFFICE
CERTIFICATE OF CORRECTION

PATENT NO. : 5,848,231

DATED : December 8, 1998

INVENTOR(S) : Teitelbaum et al

It is certified that error appears in the above-identified patent and that said Letters Patent is hereby corrected as shown below:

Col. 12, line 41, "piano" should read – plano –

Col. 15, line 48, "of" should read – on –

Col. 19, line 15, after "dynamically, insert the word – providing –

Signed and Sealed this

Thirtieth Day of March, 1999

Attest:

Q. TODD DICKINSON

Attesting Officer

Acting Commissioner of Patents and Trademarks